United States Patent
Zhang et al.

(10) Patent No.: US 10,267,982 B2
(45) Date of Patent: Apr. 23, 2019

(54) LIGHT BAR ADHESIVE TAPE FOR BACKLIGHT SOURCE

(71) Applicants: BOE TECHNOLOGY GROUP CO., LTD., Beijing (CN); BOE OPTICAL SCIENCE AND TECHNOLOGY CO., LTD., Suzhou, Jiangsu (CN)

(72) Inventors: Qi Zhang, Beijing (CN); Deyu Meng, Beijing (CN)

(73) Assignees: BOE TECHNOLOGY GROUP CO., LTD., Beijing (CN); BOE OPTICAL SCIENCE AND TECHNOLOGY CO., LTD., Suzhou, Jiangsu (CN)

( * ) Notice: Subject to any disclaimer, the term of this patent is extended or adjusted under 35 U.S.C. 154(b) by 160 days.

(21) Appl. No.: 15/327,863

(22) PCT Filed: Feb. 5, 2016

(86) PCT No.: PCT/CN2016/073619
§ 371 (c)(1),
(2) Date: Jan. 20, 2017

(87) PCT Pub. No.: WO2017/054388
PCT Pub. Date: Apr. 6, 2017

(65) Prior Publication Data
US 2017/0276858 A1    Sep. 28, 2017

(30) Foreign Application Priority Data
Sep. 30, 2015    (CN) .......................... 2015 1 0639245

(51) Int. Cl.
C09D 133/12    (2006.01)
F21V 8/00    (2006.01)
C09J 7/29    (2018.01)

(52) U.S. Cl.
CPC .......... *G02B 6/009* (2013.01); *C09D 133/12* (2013.01); *C09J 7/29* (2018.01); *G02B 6/004* (2013.01);
(Continued)

(58) Field of Classification Search
CPC ............. B32B 2405/00; C09J 2203/318; C09J 7/0217; C09J 133/08; G02B 6/009;
(Continued)

(56) References Cited

U.S. PATENT DOCUMENTS

2012/0063168 A1* 3/2012 Nambu ................ G02B 6/0031
362/609
2013/0316112 A1* 11/2013 Leonhard .................. B32B 3/10
428/38

(Continued)

FOREIGN PATENT DOCUMENTS

CN    1478841 A    3/2004
CN    101193994 A    6/2008
(Continued)

OTHER PUBLICATIONS

First Chinese Office Action, for Chinese Patent Application No. 201510639245.3, dated May 2, 2017, 9 pages.
(Continued)

*Primary Examiner* — Anabel Ton
(74) *Attorney, Agent, or Firm* — Kinney & Lange, P.A.

(57) ABSTRACT

The present disclosure relates to a light bar adhesive tape for a backlight source, including: a transparent bonding material layer configured to be bonded to a surface of a light bar flexible circuit board; a black and white flexible coating layer having a black surface on one side and a white surface on the other side, the white surface of the black and white flexible coating layer being bonded with the transparent bonding material layer; and a black and white bonding
(Continued)

material layer having a black surface on one side and a white surface on the other side, the black surface of the black and white bonding material layer being bonded with the black surface of the black and white flexible coating layer. The present disclosure also relates to a backlight module including the light bar adhesive tape as above described and a display device including the backlight module.

15 Claims, 4 Drawing Sheets

(52) U.S. Cl.
CPC ......... *G02B 6/0043* (2013.01); *G02B 6/0046* (2013.01); *G02B 6/0086* (2013.01); *C09J 2201/134* (2013.01); *C09J 2201/36* (2013.01); *C09J 2203/318* (2013.01); *C09J 2203/326* (2013.01); *C09J 2467/006* (2013.01)

(58) Field of Classification Search
CPC .... G02B 6/004; G02B 6/0043; G02B 6/0046; G02B 6/0086
See application file for complete search history.

(56) References Cited

U.S. PATENT DOCUMENTS

| | | | |
|---|---|---|---|
| 2015/0086767 A1* | 3/2015 | Komatsuzaki | ......... C09J 7/0289 428/220 |
| 2016/0339672 A1* | 11/2016 | Kagiyama | .................. C09J 7/29 |
| 2017/0363909 A1* | 12/2017 | Hirayama | ............ G02B 6/0035 |

FOREIGN PATENT DOCUMENTS

| | | |
|---|---|---|
| CN | 101326458 A | 12/2008 |
| CN | 103254814 A | 8/2013 |
| CN | 204509180 U | 7/2015 |
| CN | 105176437 A | 12/2015 |
| CN | 205088175 U | 3/2016 |
| EP | 1654335 B1 | 7/2008 |
| JP | 2007246881 A | 9/2007 |
| JP | 2008088335 A | 4/2008 |

OTHER PUBLICATIONS

International Search Report and Written Opinion (including English translation of Box V) dated May 18, 2016, for corresponding PCT Application No. PCT/CN2016/073619.

* cited by examiner

LIGHT BAR ADHESIVE TAPE FOR BACKLIGHT SOURCE

CROSS-REFERENCE TO RELATED APPLICATION

This application claims the benefit of Chinese Patent Application No. 201510639245.3 filed on Sep. 30, 2015 in the State Intellectual Property Office of China, the whole disclosure of which is incorporated herein by reference.

BACKGROUND OF THE INVENTION

Field of the Invention

The embodiments of the present disclosure relate to a light bar adhesive tape, more particular, to a light bar adhesive tape of the backlight source.

Description of the Related Art

Recently, a backlight unit of a smart phone has a development trend of "narrower", "thinner" and "brighter". A light emitting diode (LED) used in the backlight bar adhesive tape of the smart phone emits light laterally, and the incidence distance is in a range between 1.5 mm and 3.0 mm. A light-emitting surface of the LED has a height of about 0.5 mm and a width of about 3.0 mm, that's to say, a single LED light source is approximately acted as a point light source (the LED has a normal incidence in a light guide plate, and the light intensity and the brightness thereof are constant), according to the illuminance equation of a point light source $$E = \frac{I * \cos i}{R^2}; I = \frac{\varphi}{\omega};$$

in which φ is the luminous flux, ω is the spatial angle, I is the light intensity, R is the distance from the light source to the light guide plate. It can be determined from the above equation that, the illuminance created in a certain area illuminated by a point light is in direct proportion to the light intensity of the light source, but is in inverse proportion to the square of the distance from the light source to the illuminated area. Therefore, it causes inevitably the phenomena of bright band and hot spot on the incident light side of the backlight source.

The bright band on the incident light side of the backlight source cannot be notably improved merely by a mesh in the light guide plate and V-CUT. If a backlight source with a black light bar adhesive tape of rectangular ring shape is merely used, an average brightness of the backlight source will be reduced by about 10%, thereby the optical specification of the backlight source cannot reach the standard value required by the recent market. Further, a press on the incident light side of the backlight source will further reduce the average brightness of the backlight source by 3% to 5%.

SUMMARY OF THE INVENTION

There is provided a light bar adhesive tape in the present disclosure, which comprises: a transparent bonding material layer configured to be bonded to a surface of a light bar flexible circuit board; a black and white flexible coating layer having a black surface on one side and a white surface on the other side, the white surface of the black and white flexible coating layer being bonded with the transparent bonding material layer; and a black and white bonding material layer having a black surface on one side and a white surface on the other side, the black surface of the black and white bonding material layer being bonded with the black surface of the black and white flexible coating layer.

According to an embodiment of the present disclosure, the black and white flexible coating layer consists of a transparent substrate, as well as black coating particles and white coating particles coating two surfaces of the transparent substrate respectively; and the black coating particles constitute the black surface of the black and white flexible coating layer, and the white coating particles constitute the white surface of the black and white flexible coating layer.

According to an embodiment of the present disclosure, a radius of the white coating particle is larger than that of the black coating particle. Preferably, the radius of the white coating particle is twice of that of the black coating particle.

According to an embodiment of the present disclosure, the transparent substrate is made from polyethylene terephthalate (PET), and has a thickness between 0.014 mm and 0.024 mm.

According to an embodiment of the present disclosure, the white coating particle has a radius of 0.002 mm, and the black coating particle has a radius of 0.001 mm.

According to an embodiment of the present disclosure, the black and white flexible coating layer may have a thickness between 0.015 mm and 0.025 mm.

According to an embodiment of the present disclosure, the transparent bonding material layer may have a thickness between 0.02 mm and 0.04 mm.

According to an embodiment of the present disclosure, the black and white bonding material layer may have a thickness between 0.02 mm and 0.04 mm.

According to an embodiment of the present disclosure, the black and white flexible coating layer may be wider than the black and white bonding material layer by a value between 1.0 mm and 3.0 mm.

According to an embodiment of the present disclosure, the light bar adhesive tape may have a width between 2.0 mm and 6.0 mm, and has a thickness between 0.055 mm and 0.105 mm.

According to an embodiment of the present disclosure, the white coating particles and the black coating particles are made from a mixture of polymethyl methacrylate and resin.

According to an embodiment of the present disclosure, the white surface of the black and white bonding material layer is bonded to a light emitting diode (LED), and a part of the black surface of the black and white flexible coating layer covers a flared bevel of a light guide plate.

According to the present disclosure, due to the light bar adhesive tape has the black and white flexible coating layer protruding from the light bar adhesive tape by 1.0 mm to 3.0 mm, an airtight contact can be achieved between the black surface and the flared bevel of a light guide plate (LGP), thereby reducing non-effective light luminance in front of the backlight source, and finally eliminating the bright band in front of the backlight source. On the other hand, the light bar adhesive tape is attached behind the light bar flexible circuit board, and the white adhesive surface is in front of the light emitting surface of LED, thereby keeping the luminous efficiency of light source of the LED unchanged and finally guaranteeing the stability of the overall light brightness of the backlight source.

Preferably, in the black and white flexible coating layer, the radius of the white coating particle is larger than the radius of the black coating particle, preferably the radius of the white coating particle is twice of that of the black coating particle; and therefore, according to Snell's Law, it finally increases the emergent angle on the incident light side of the backlight source and achieves an increasing atomization effect on the incident light side of the backlight source and thus eliminates the phenomena of hot spot on the incident light side of the backlight source. There is also provided a backlight module in the embodiments of the present disclosure, which comprises: a light source; a light guide plate adjacent to the light source and having a flared bevel; and a light bar adhesive tape as previously described, wherein the white surface of the black and white bonding material layer of the light bar adhesive tape is bonded to the light source, and a part of the black surface of the black and white flexible coating layer covers the flared bevel of the light guide plate.

There is further provided a display device in the embodiments of the preset disclosure, which comprises a backlight module as described previously.

BRIEF DESCRIPTION OF THE DRAWINGS

The above and other features of the present disclosure will become more apparent by describing in detail exemplary embodiments thereof with reference to the accompanying drawings, in which.

In all attached drawings of the present disclosure, the same or similar structures are all identified with the same or similar reference numerals. Further, the drawings of the present disclosure are only shown schematically and not drew to scale.

DETAILED DESCRIPTION OF PREFERRED EMBODIMENTS OF THE INVENTION

The preferred embodiments of the present disclosure will be described in detail hereinafter with reference to the drawings, wherein the details and functions unnecessary for the present disclosure will be omitted in the description so as to prevent confusion in understanding the present disclosure. In the following, taking that the present disclosure being applied to the LED for example, the present disclosure will be described in detail. However, the present disclosure is not limited thereto, but may be applied to any other appropriate backlight source, such as laser diode (LD) or the like.

Figure 1A:
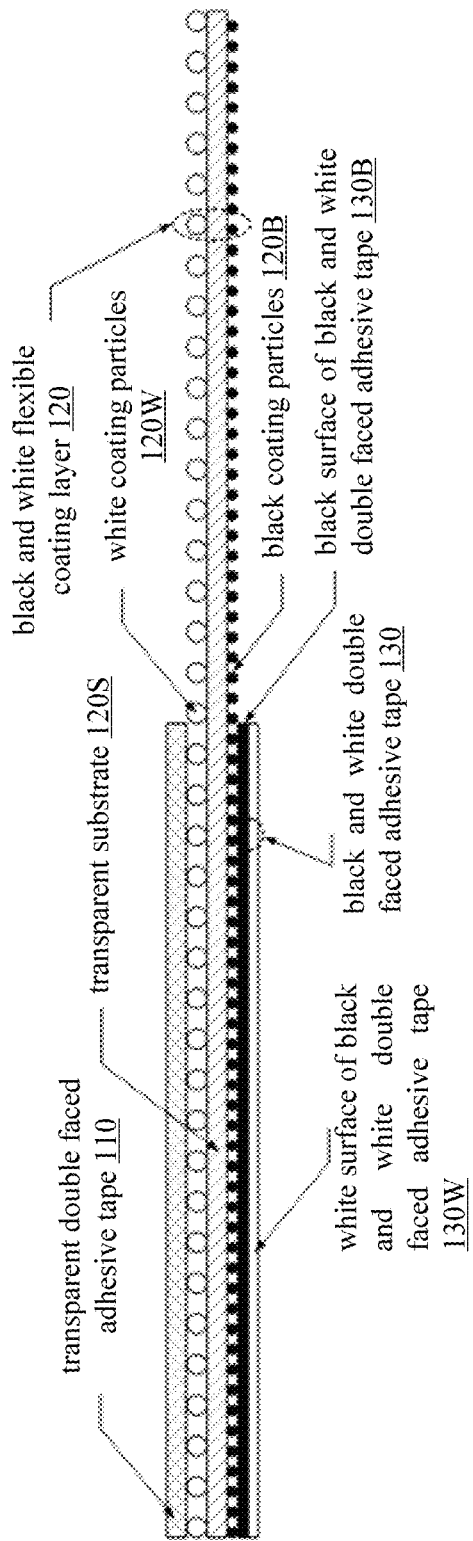
FIG. 1A is a schematic view showing a layered structure of the light bar adhesive tape according to an embodiment of the present disclosure.

FIG. 1A is a schematic view showing a layered structure of the light bar adhesive tape according to an embodiment of the present disclosure. As shown in FIG. 1, the light bar adhesive tape according to the embodiment of the present disclosure comprises: a transparent double faced adhesive tape 110 (a transparent bonding material layer) configured to be bonded to a surface of a light bar flexible circuit board (see FIG. 2); a black and white flexible coating layer 120 having a black surface on one side and a white surface on the other side, and the white surface of the black and white flexible coating layer 120 is bonded with the transparent double faced adhesive tape 110; and a black and white double faced adhesive tape 130 (a black and white bonding material layer) having a black surface 130B on one side and a white surface 130W on the other side, and the black surface 130B of the black and white double faced adhesive tape 130 is bonded with the black surface of the black and white flexible coating layer 120.

In an embodiment, the black and white flexible coating layer consists of a transparent substrate 120S, as well as black coating particles 120B and white coating particles 120W coating two surfaces of the transparent substrate 120s respectively; and the black coating particles 120B constitute the black surface of the black and white flexible coating layer, and the white coating particles 120W constitute the white surface of the black and white flexible coating layer. It should be pointed out that the white coating particles and the black coating particles may be made from commonly used materials in the material coating filed, such as a mixture of polymethyl methacrylate (PMMA) and resin.

The transparent substrate 120S may be made from polyethylene terephthalate (PET), and has a thickness between 0.014 mm and 0.024 mm.

Figure 1B:
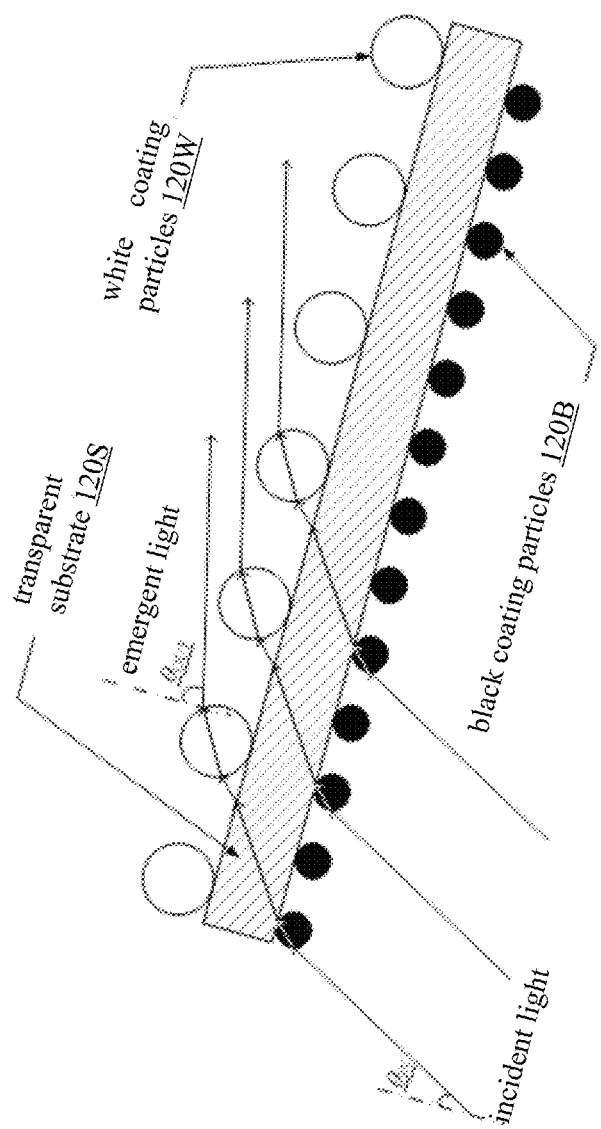
FIG. 1B is a schematic view for describing the scattering effect of the black and white flexible coating layer used in the embodiment of the present disclosure on an incident light.

A radius of the white coating particle 120W is larger than that of the black coating particle 120B. Preferably, the radius of the white coating particle 120W is twice of that of the black coating particle 120B, for example, the white coating particle 120W has a radius of 0.002 mm, and the black coating particle 120B has a radius of 0.001 mm. With reference to FIG. 1B, which describes the scattering effect of the black and white flexible coating layer 120 used in the embodiment of the present disclosure on an incident light, according to Snell's Law, i.e. refraction law of light $n_B \sin \theta_{IN} = n_W \sin \theta_{OUT}$ (wherein the refractive index $n_B$ of a black coating particles layer is larger than the refractive index $n_W$ of a white coating particles layer, i.e. $n_B > n_W$), an incident angle $\theta_{IN}$ of the incident light (for example, see FIG. 2, the light from the light emitting surface of LED 200) is smaller than an emergent angle $\theta_{OUT}$ of the emergent light (the refractive light), i.e. $\theta_{IN} < \theta_{OUT}$, finally increasing the emergent angle on the incident light side of the backlight source and achieving an increased atomization effect on the incident light side of the backlight source and eliminating the phenomenon of hot spot on the incident light side of the backlight source.

The black and white flexible coating layer 120 may have a total thickness between 0.015 mm and 0.025 mm.

The transparent bonding material layer 110 may have a thickness between 0.02 mm and 0.04 mm. The black and white bonding material layer 130 may have a thickness between 0.02 mm and 0.04 mm.

Therefore, the light bar adhesive tape may have a total thickness between 0.055 mm and 0.105 mm.

Further, the black and white flexible coating layer 120 is wider than the transparent bonding material layer 110 and the black and white bonding material layer 130 by a value between 1.0 mm and 3.0 mm. The light bar adhesive tape has a total width between 2.0 mm and 6.0 mm.

Figure 2:
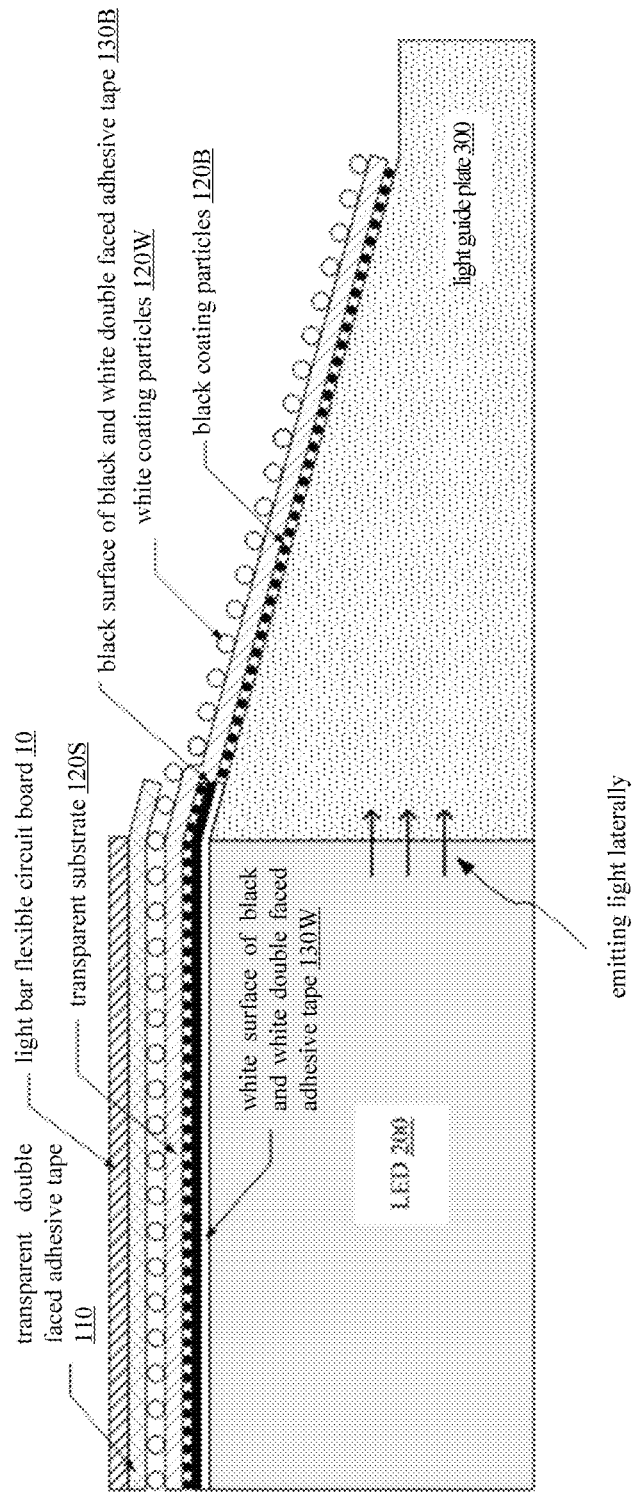
FIG. 2 is a schematic view of the application scene of the light bar adhesive tape according to the embodiment of the present disclosure.

FIG. 2 is a schematic view of the application scene of the light bar adhesive tape according to the embodiment of the present disclosure. As shown in FIG. 2, the transparent bonding material layer 110 of the light bar adhesive tape is bonded to a surface of the light bar flexible circuit board 10, and the white surface 130W of the black and white double faced adhesive tape 130 is bonded to the light emitting diode 200. The black and white flexible coating layer 120 is wider than the black and white bonding material layer 110, which makes the black and white flexible coating layer 120 protrude the light bar adhesive tape. The black surface with the black coating particles 120B of the protrusion of the black and white flexible coating layer 120 covers a flared bevel of a light guide plate (LGP) 300. Since the light bar adhesive tape has the black and white flexible coating layer 120 protruding therefrom by 1.0 mm to 3.0 mm, a seamless contact can be achieved between the black surface 120B and the flared bevel of a light guide plate (LGP) 300, thereby reducing non-effective light luminance in front of the backlight source, and finally eliminating the bright band in front of the backlight source. On the other hand, the light bar adhesive tape is attached behind the light bar flexible circuit board 10, and the white adhesive surface 130W is in front of the light emitting surface of LED 200, thereby maintaining the luminous efficiency of light source of the LED 200 unchanged and finally guaranteeing the stability of the overall light brightness of the backlight source.

Figure 3:
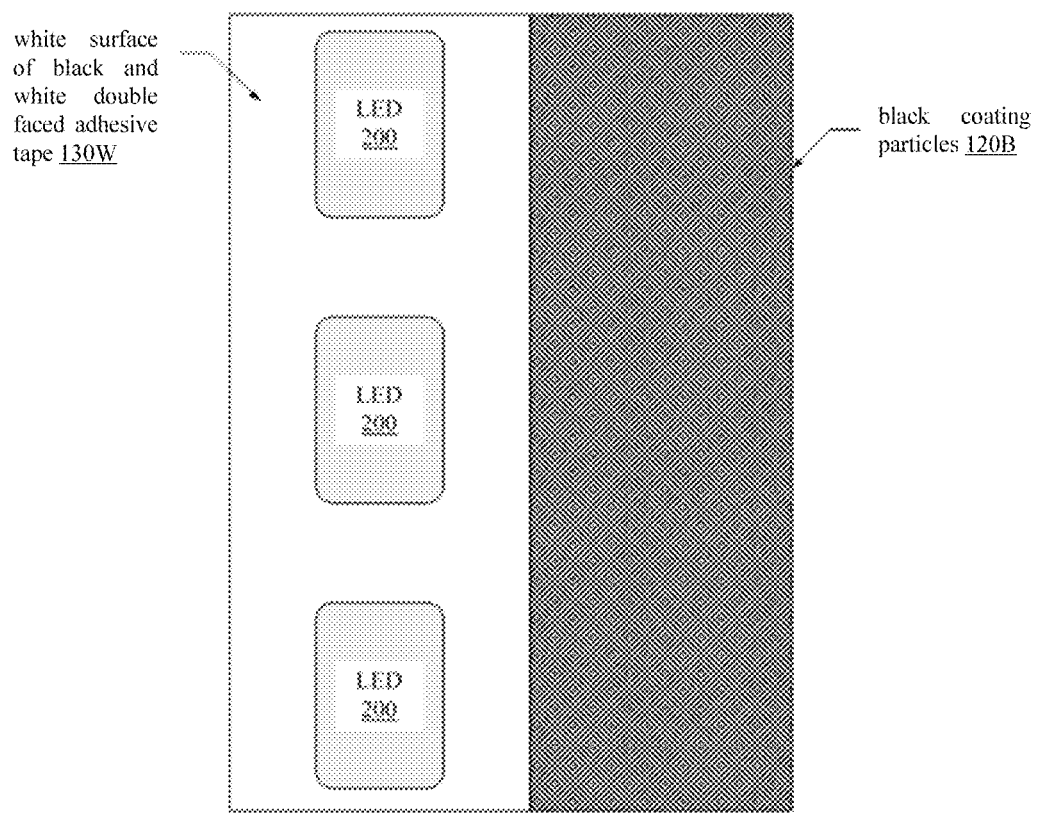
FIG. 3 is a schematic view of a front projection of the light bar adhesive tape according to the embodiment of the present disclosure.

FIG. 3 is a schematic view of a front projection of the light bar adhesive tape according to the embodiment of the present disclosure. A plurality of LEDs 200 are bonded to the white surface 130W of the black and white double faced adhesive tape 130 of the light bar adhesive tape; and the black surface 120B with the black coating particles of the black and white flexible coating layer 120 is wider than the black and white double faced adhesive tape 130 by 1.0 mm to 3.0 mm which makes the black and white flexible coating layer 120 protrude the light bar adhesive tape, so as to cover a flared bevel of a light guide plate (LGP) 300.

According to the present disclosure, in the black and white flexible coating layer, the radius of the white coating particle is twice of that of the black coating particle; and according to Snell's Law, it finally increases the emergent angle on the incident light side of the backlight source and achieves an increased atomization effect on the incident light side of the backlight source and thus eliminates the phenomenon of hot spot on the incident light side of the backlight source. Furthermore, as the black and white flexible coating layer 120 is wider than the black and white bonding material layer 110 by a value between 1.0 mm and 3.0 mm, which makes the black and white flexible coating layer 120 protrude the light bar adhesive tape by a value between 1.0 mm and 3.0 mm, a seamless contact can be achieved between the black surface of the protrusion of the black and white flexible coating layer 120 and the flared bevel of a light guide plate (LGP), thereby reducing non-effective light luminance in front of the backlight source, and finally eliminating the bright band in front of the backlight source. On the other hand, the light bar adhesive tape is attached behind the light bar flexible circuit board, and the white adhesive surface is in front of the light emitting surface of LED, thereby maintaining the luminous efficiency of the LED light source unchanged and finally guaranteeing the stability of the overall light brightness of the backlight source.

Further, there is provided a backlight module in the embodiment of the present disclosure, comprising: a light source; a light guide plate adjacent to the light source and having a flared bevel, as shown in FIG. 2; and a light bar adhesive tape as described above, wherein the white surface of the black and white bonding material layer of the light bar adhesive tape is bonded to the light source, and a part of the black surface of the black and white flexible coating layer covers the flared bevel of the light guide plate.

There is also provided a display device comprising the backlight module as previously described.

So far now, the present disclosure has been described in combination with the preferred embodiments. It should be appreciated by those skilled in the art that various changes, modifications and additions may be made to these embodiments without departing from the spirit and scope of the disclosure. Therefore, the scope of the present disclosure is not limited to the above-mentioned certain embodiments, and should be defined by the appended claims and their equivalents.

What is claimed is:

1. An adhesive tape used in a light bar, comprising:
    a transparent bonding material layer configured to be bonded to a surface of a flexible circuit board of the light bar;
    a black and white flexible coating layer having a black surface on one side and a white surface on the other side, the white surface of the black and white flexible coating layer being bonded with the transparent bonding material layer; and
    a black and white bonding material layer having a black surface on one side and a white surface on the other side, the black surface of the black and white bonding material layer being bonded with the black surface of the black and white flexible coating layer.

2. The adhesive tape used in a light bar according to claim 1, wherein the black and white flexible coating layer includes a transparent substrate, as well as black coating particles and white coating particles coating two surfaces of the transparent substrate respectively; and
    the black coating particles constitute the black surface of the black and white flexible coating layer, and the white coating particles constitute the white surface of the black and white flexible coating layer.

3. The adhesive tape used in a light bar according to claim 2, wherein a radius of the white coating particles is larger than that of the black coating particles.

4. The adhesive tape used in a light bar according to claim 3, wherein the radius of the white coating particles is twice of that of the black coating particles.

5. The adhesive tape used in a light bar according to claim 2, wherein the transparent substrate is made from polyethylene terephthalate, and has a thickness between 0.014 mm and 0.024 mm.

6. The adhesive tape used in a light bar according to claim 2, wherein the white coating particles have a radius of 0.002 mm, and the black coating particles have a radius of 0.001 mm.

7. The adhesive tape used in a light bar according to claim 1, wherein the black and white flexible coating layer has a thickness between 0.015 mm and 0.025 mm.

8. The adhesive tape used in a light bar according to claim 1, wherein the transparent bonding material layer has a thickness between 0.02 mm and 0.04 mm.

9. The adhesive tape used in a light bar according to claim 1, wherein the black and white bonding material layer has a thickness between 0.02 mm and 0.04 mm.

10. The adhesive tape used in a light bar according claim 1, wherein the black and white flexible coating layer is wider than the black and white bonding material layer by a value between 1.0 mm and 3.0 mm.

11. The adhesive tape used in a light bar according to claim 1, wherein the adhesive tape used in a light bar has a width between 2.0 mm and 6.0 mm, and has a thickness between 0.055 mm and 0.105 mm.

12. The adhesive tape used in a light bar according to claim 2, wherein the white coating particles and the black coating particles are made from a mixture of polymethyl methacrylate and resin.

13. The adhesive tape used in a light bar according to claim 2, wherein the white surface of the black and white bonding material layer is bonded to a light emitting diode (LED), and a part of the black surface of the black and white flexible coating layer covers a flared bevel of a light guide plate.

14. A backlight module, comprising:
a light source;
a light guide plate joined to the light source and having a flared bevel at a part of the light guide plate adjacent to the light source; and
the adhesive tape used in a light bar according to claim 1, wherein the white surface of the black and white bonding material layer of the adhesive tape used in a light bar is bonded to the light source, and a part of the black surface of the black and white flexible coating layer covers the flared bevel of the light guide plate.

15. A display device comprising a backlight module according to claim 14.

* * * * *